US012607468B2

(12) United States Patent
Selvam et al.

(10) Patent No.: US 12,607,468 B2
(45) Date of Patent: Apr. 21, 2026

(54) MACHINE LEARNING BASED GENERATION AND USE OF SYNTHETIC DRIVE CYCLES

(71) Applicant: EXERGI PREDICTIVE LLC, Hugo, MN (US)

(72) Inventors: Harish Panneer Selvam, Littleton, CO (US); Andrew Kotz, Denver, CO (US); William Northrop, Minneapolis, MN (US)

(73) Assignee: EXERGI PREDICTIVE LLC, Hugo, MN (US)

(*) Notice: Subject to any disclaimer, the term of this patent is extended or adjusted under 35 U.S.C. 154(b) by 60 days.

(21) Appl. No.: 18/429,118

(22) Filed: Jan. 31, 2024

(65) Prior Publication Data

US 2025/0244132 A1      Jul. 31, 2025

(51) Int. Cl.
*G01C 21/34* (2006.01)
*G01C 21/36* (2006.01)

(52) U.S. Cl.
CPC ..... *G01C 21/3446* (2013.01); *G01C 21/3667* (2013.01)

(58) Field of Classification Search
CPC ........................ G01C 21/3446; G01C 21/3667
See application file for complete search history.

(56) References Cited

U.S. PATENT DOCUMENTS

| | | |
|---|---|---|
| 10,850,588 B2 | 12/2020 | Northrop et al. |
| 12,031,824 B2 * | 7/2024 | Wheeler ................ G05D 1/248 |

| | | | | |
|---|---|---|---|---|
| 2015/0134245 | A1 * | 5/2015 | Meredith | ............... G01C 21/20 |
| | | | | 701/491 |
| 2020/0108732 | A1 | 4/2020 | Northrop et al. | |
| 2021/0004017 | A1 * | 1/2021 | Colgate | .................. G01C 21/30 |
| 2021/0174678 | A1 * | 6/2021 | Wright | ................. G06F 9/5072 |
| 2021/0404832 | A1 * | 12/2021 | Baig | .................. G01C 21/3415 |
| 2022/0402520 | A1 * | 12/2022 | Hetang | ............. G01C 21/3602 |
| 2022/0402521 | A1 * | 12/2022 | Hetang | ............. B60W 60/0011 |

(Continued)

FOREIGN PATENT DOCUMENTS

| | | | | | |
|---|---|---|---|---|---|
| CN | 113034210 A | * | 6/2021 | ......... | G06F 18/2135 |
| DE | 102016222729 B4 | * | 10/2023 | ............... | G07C 5/08 |

OTHER PUBLICATIONS

Condensation of Real-World Drive Cycle into Synthetic Drive Cycle—An Innovative Method to Predict Real Driving Emissions, Sangeetha RT, Anshuman Bose, and Mohamed Ibrahim, Apr. 6, 2021 (Year: 2021).*

(Continued)

*Primary Examiner* — Rami Khatib
(74) *Attorney, Agent, or Firm* — Edlavitch Law PLLC

(57) ABSTRACT

Techniques for using machine learning to generate and use synthetic drive cycles of mobile actors such as a moving person or a mobile machine, as well as technologies for using machine learning to generate and use synthetic duty cycles of mobile machines. Synthetic drive or duty cycle generation and use can be for a person or machine moving from one place to another regardless of the complexity of the corresponding route and the complexity of other variables involved. Mobile machines can include any type of mobile machine for any industrial or consumer use. Mobile machines can include watercraft, aircraft, terrestrial vehicles, automobiles, or robots, for example.

20 Claims, 8 Drawing Sheets

(56) References Cited

U.S. PATENT DOCUMENTS

| | | | | |
|---|---|---|---|---|
| 2023/0339504 | A1* | 10/2023 | Gaffin-Cahn | B60W 60/0011 |
| 2025/0104559 | A1* | 3/2025 | Bishwas | G06N 5/01 |
| 2025/0113758 | A1* | 4/2025 | Zhou | A01B 69/008 |

OTHER PUBLICATIONS

Holden et al., RouteE: A Vehicle Energy Consumption Prediction Engine (Abstract), https://saemobilus.sae.org/content/2020-01-0939.

Esser et al., Stochastic Synthesis of Representative and Multidimensional Driving Cycles, Article ID: 2018-01-0095, SAE International, doi:10.4271/2018-01-0095.

Battlefield-Ready, Multi-Platform Intelligent Energy Management Solution, Jul. 2023.

Lee et al., Synthesis of Real-World Driving Cycles and Their Use for Estimating PHEV Energy Consumption and Charging Opportunities: Case Study for Midwest/U.S., IEEE Transactions on Vehicular Technology, vol. 60, No. 9, Nov. 2011.

Zhang et al., Development of heavy-duty vehicle representative driving cycles via decision tree regression, Transportation Research Part D: Transport and Environment vol. 95, Jun. 2021, 102843.

Mcwhirter et al, Tracked vehicle physics-based energy modelling and series hybrid system optimisation for the Bradley fighting vehicle, Jan. 2020, International Journal of Electric and Hybrid Vehicles 12(1):1 DOI:10.1504/IJEHV.2020.104271.

* cited by examiner

300

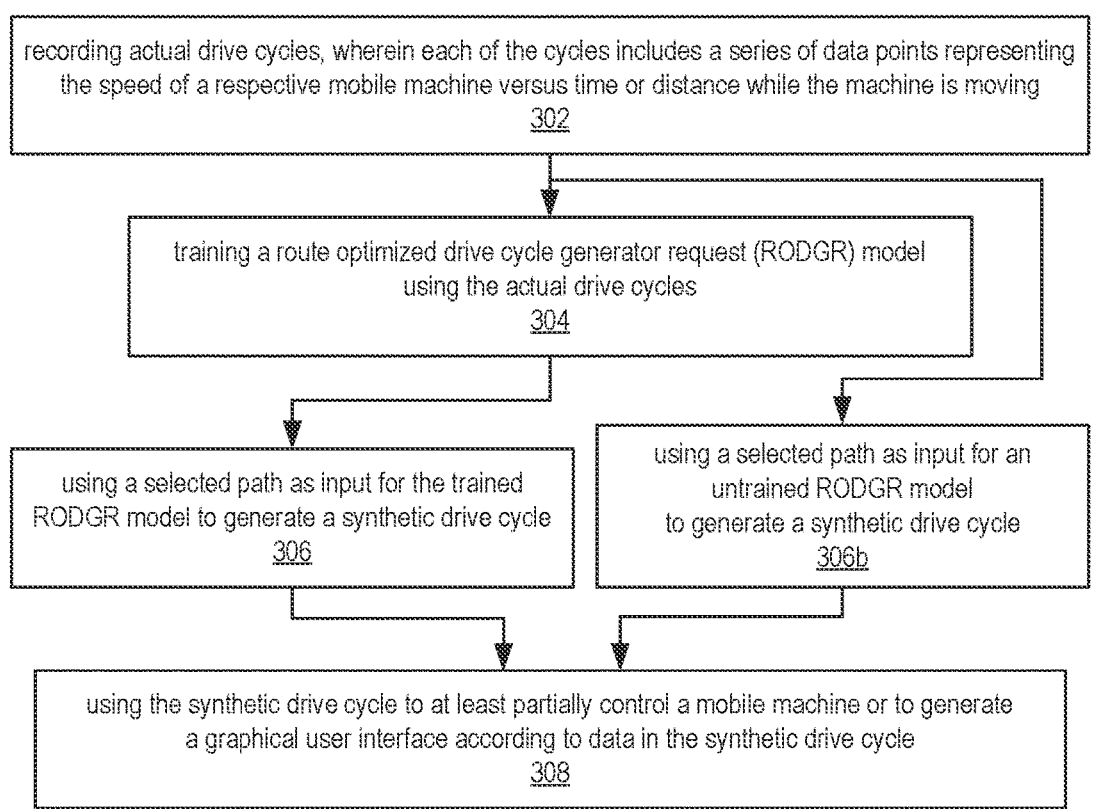

recording actual drive cycles, wherein each of the cycles includes a series of data points representing the speed of a respective mobile machine versus time or distance while the machine is moving
302 training a route optimized drive cycle generator request (RODGR) model using the actual drive cycles
304 using a selected path as input for the trained RODGR model to generate a synthetic drive cycle
306 using a selected path as input for an untrained RODGR model to generate a synthetic drive cycle
306b using the synthetic drive cycle to at least partially control a mobile machine or to generate a graphical user interface according to data in the synthetic drive cycle
308

FIG. 3

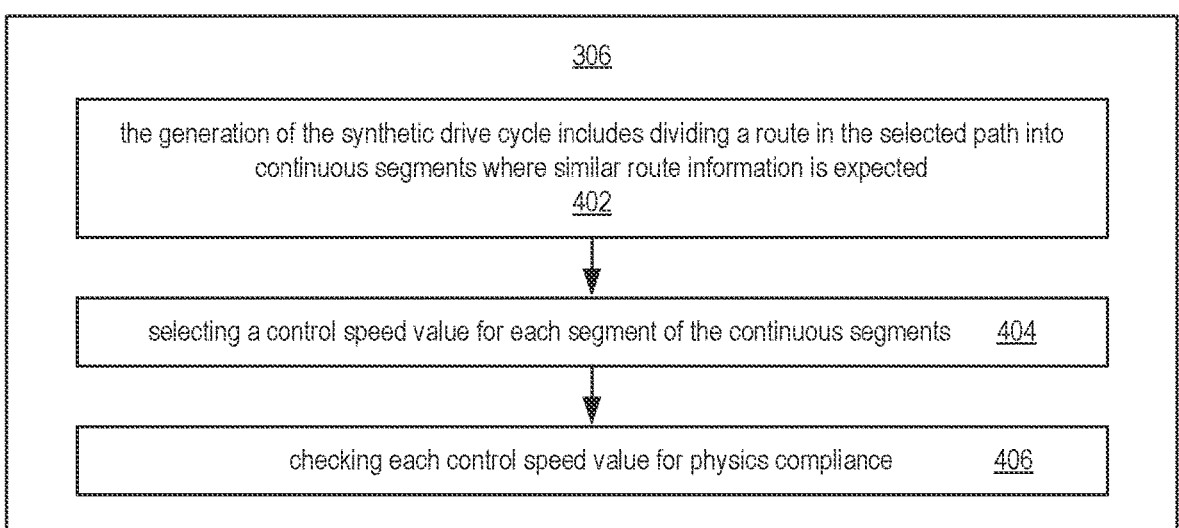

306 the generation of the synthetic drive cycle includes dividing a route in the selected path into continuous segments where similar route information is expected
402 selecting a control speed value for each segment of the continuous segments    404 checking each control speed value for physics compliance    406

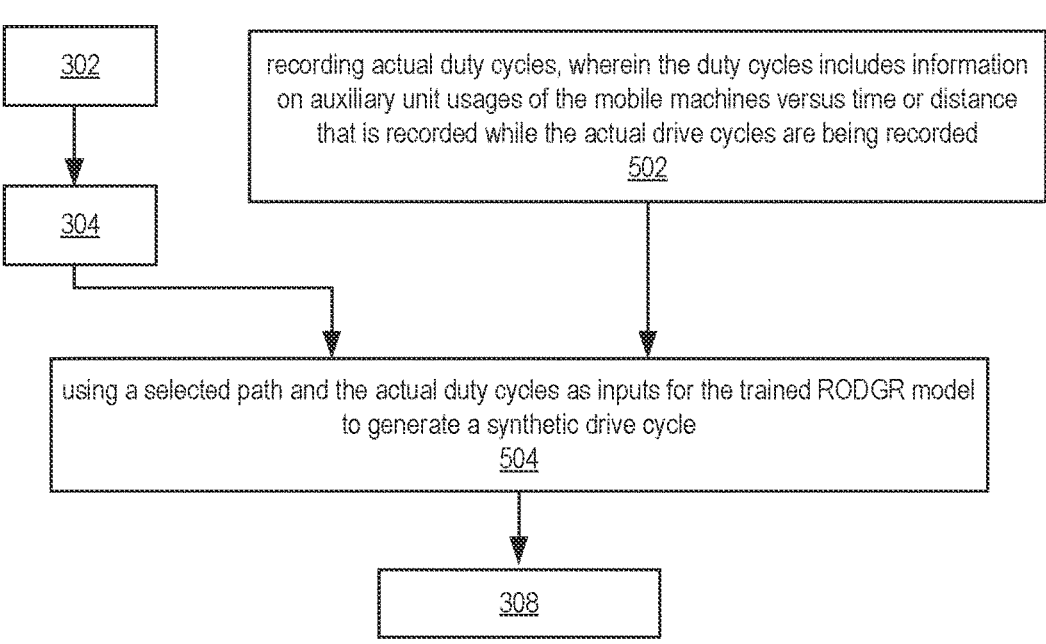

302

304 recording actual duty cycles, wherein the duty cycles includes information on auxiliary unit usages of the mobile machines versus time or distance that is recorded while the actual drive cycles are being recorded
502 using a selected path and the actual duty cycles as inputs for the trained RODGR model to generate a synthetic drive cycle
504

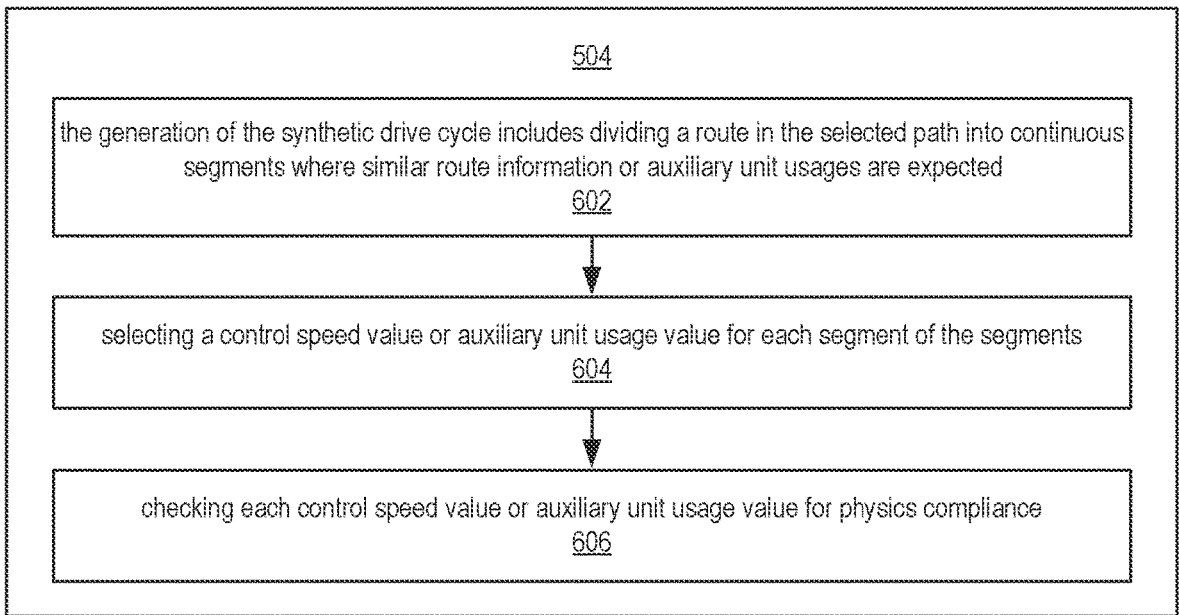

504 the generation of the synthetic drive cycle includes dividing a route in the selected path into continuous segments where similar route information or auxiliary unit usages are expected
602 selecting a control speed value or auxiliary unit usage value for each segment of the segments
604 checking each control speed value or auxiliary unit usage value for physics compliance
606

FIG. 6

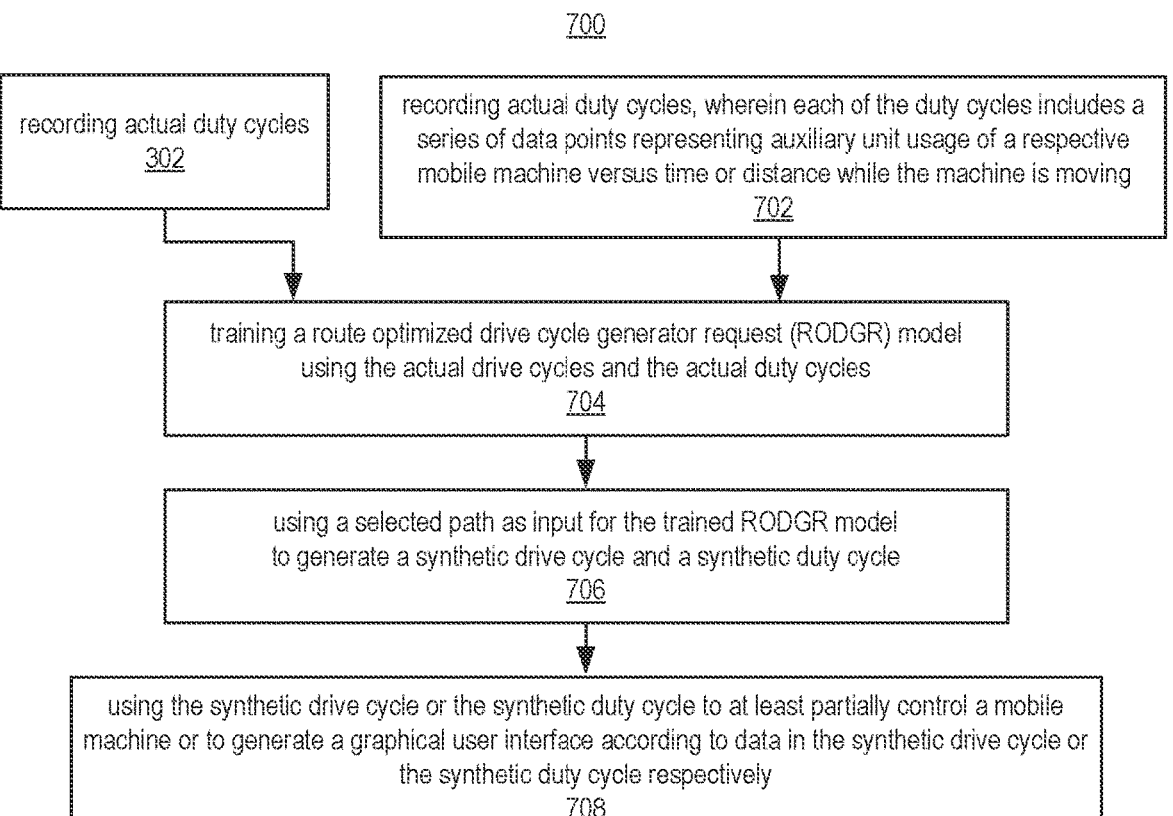

700 recording actual duty cycles
302 recording actual duty cycles, wherein each of the duty cycles includes a series of data points representing auxiliary unit usage of a respective mobile machine versus time or distance while the machine is moving
702 training a route optimized drive cycle generator request (RODGR) model using the actual drive cycles and the actual duty cycles
704 using a selected path as input for the trained RODGR model to generate a synthetic drive cycle and a synthetic duty cycle
706 using the synthetic drive cycle or the synthetic duty cycle to at least partially control a mobile machine or to generate a graphical user interface according to data in the synthetic drive cycle or the synthetic duty cycle respectively
708

FIG. 7

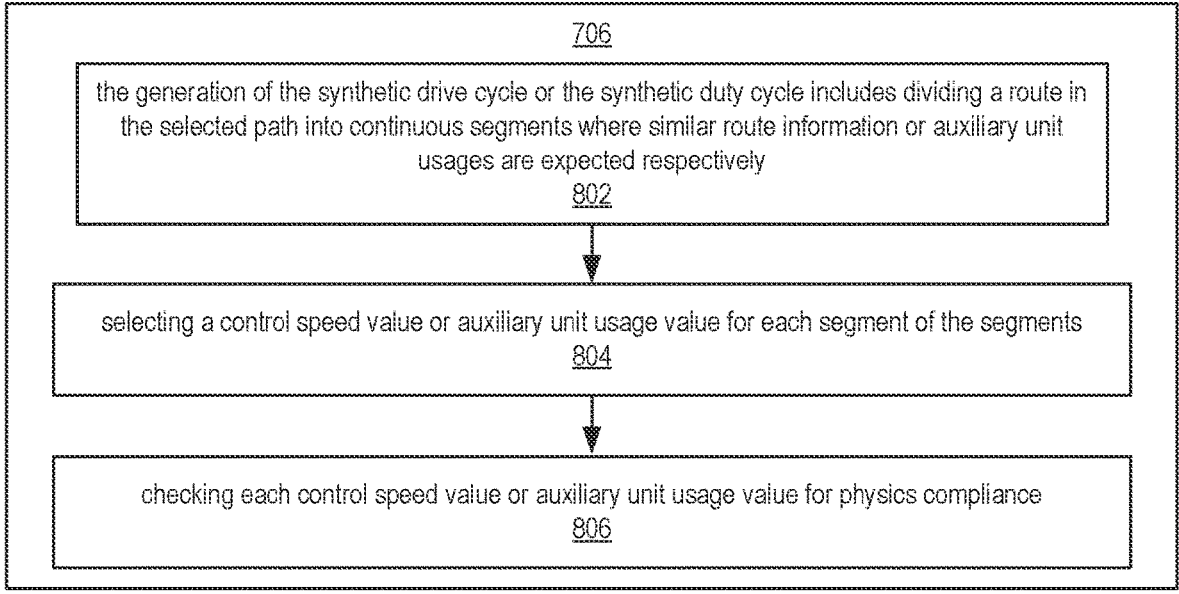

706 the generation of the synthetic drive cycle or the synthetic duty cycle includes dividing a route in the selected path into continuous segments where similar route information or auxiliary unit usages are expected respectively
802 selecting a control speed value or auxiliary unit usage value for each segment of the segments
804 checking each control speed value or auxiliary unit usage value for physics compliance
806

FIG. 8

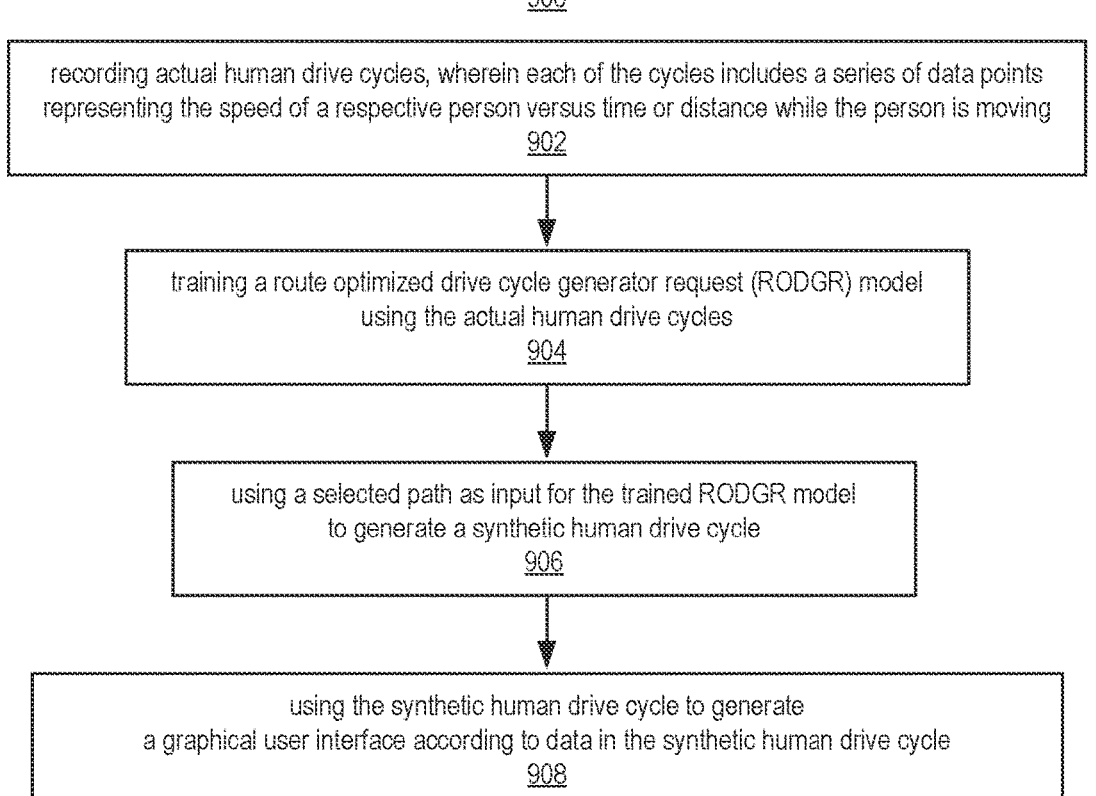

900 recording actual human drive cycles, wherein each of the cycles includes a series of data points
representing the speed of a respective person versus time or distance while the person is moving
902 training a route optimized drive cycle generator request (RODGR) model
using the actual human drive cycles
904 using a selected path as input for the trained RODGR model
to generate a synthetic human drive cycle
906 using the synthetic human drive cycle to generate
a graphical user interface according to data in the synthetic human drive cycle
908

FIG. 9

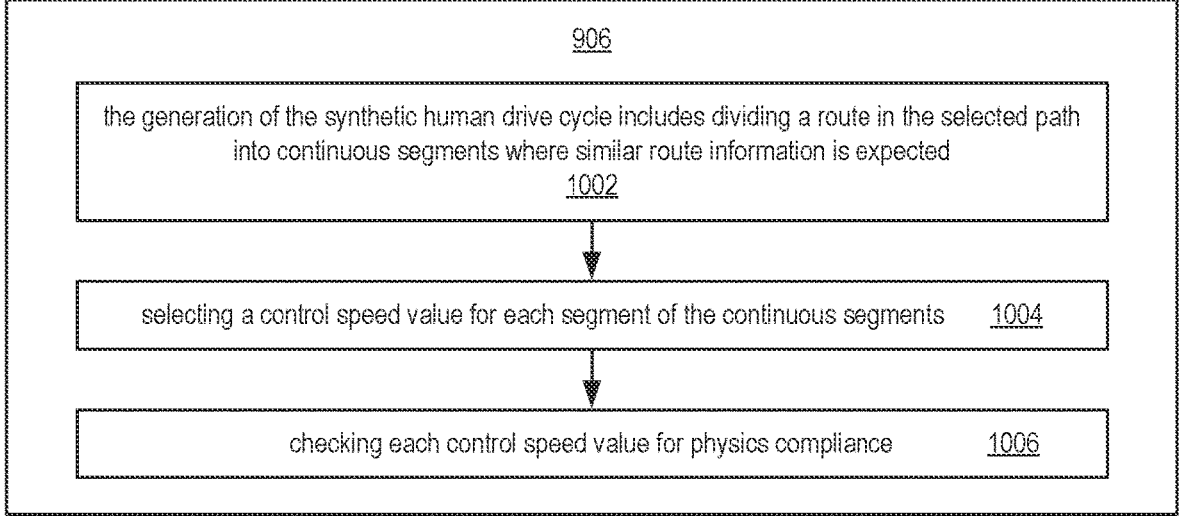

906 the generation of the synthetic human drive cycle includes dividing a route in the selected path
into continuous segments where similar route information is expected
1002 selecting a control speed value for each segment of the continuous segments    1004 checking each control speed value for physics compliance    1006

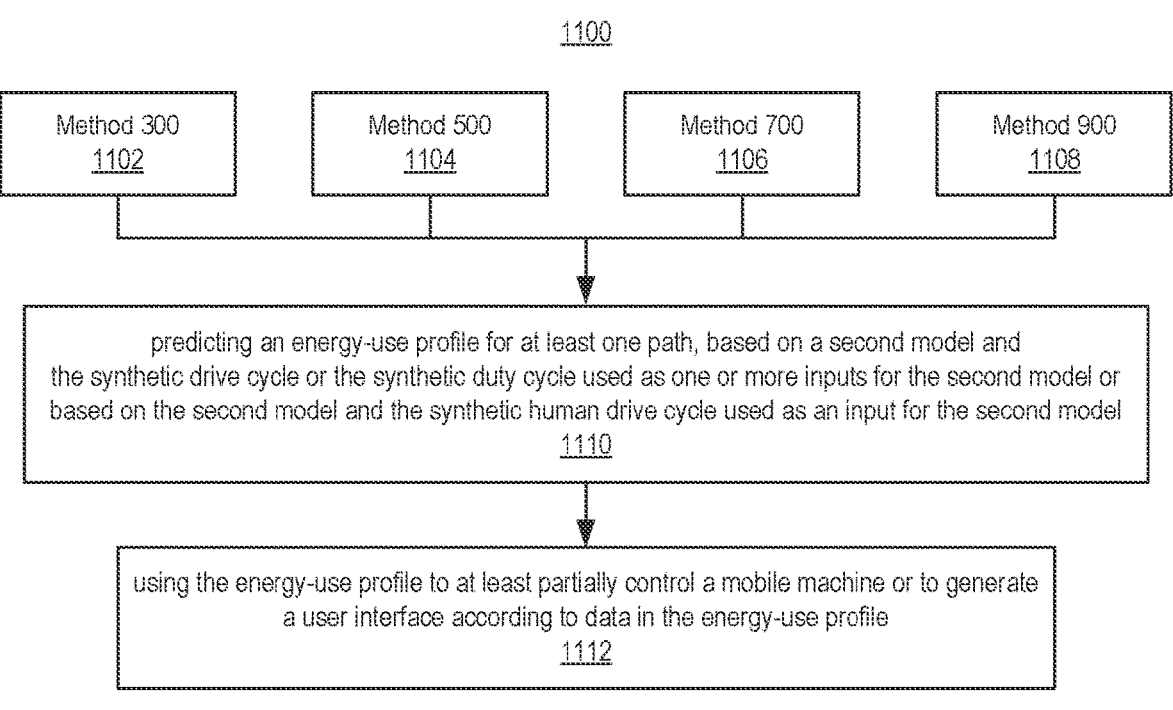

| Method 300 | Method 500 | Method 700 | Method 900 |
|---|---|---|---|
| 1102 | 1104 | 1106 | 1108 | predicting an energy-use profile for at least one path, based on a second model and the synthetic drive cycle or the synthetic duty cycle used as one or more inputs for the second model or based on the second model and the synthetic human drive cycle used as an input for the second model
1110 using the energy-use profile to at least partially control a mobile machine or to generate a user interface according to data in the energy-use profile
1112

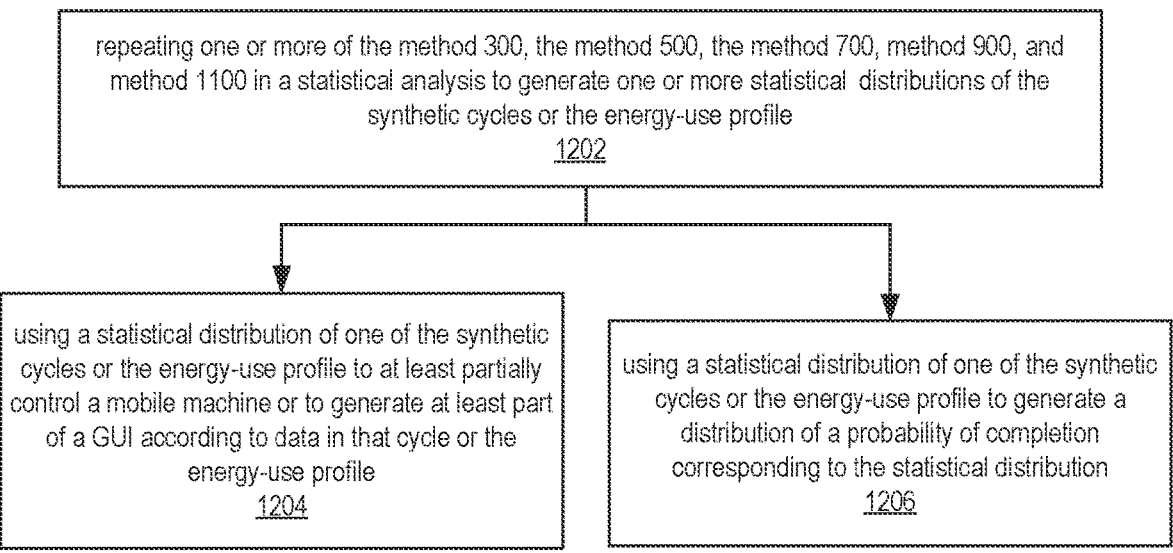

repeating one or more of the method 300, the method 500, the method 700, method 900, and method 1100 in a statistical analysis to generate one or more statistical distributions of the synthetic cycles or the energy-use profile
1202 using a statistical distribution of one of the synthetic cycles or the energy-use profile to at least partially control a mobile machine or to generate at least part of a GUI according to data in that cycle or the energy-use profile
1204 using a statistical distribution of one of the synthetic cycles or the energy-use profile to generate a distribution of a probability of completion corresponding to the statistical distribution
1206

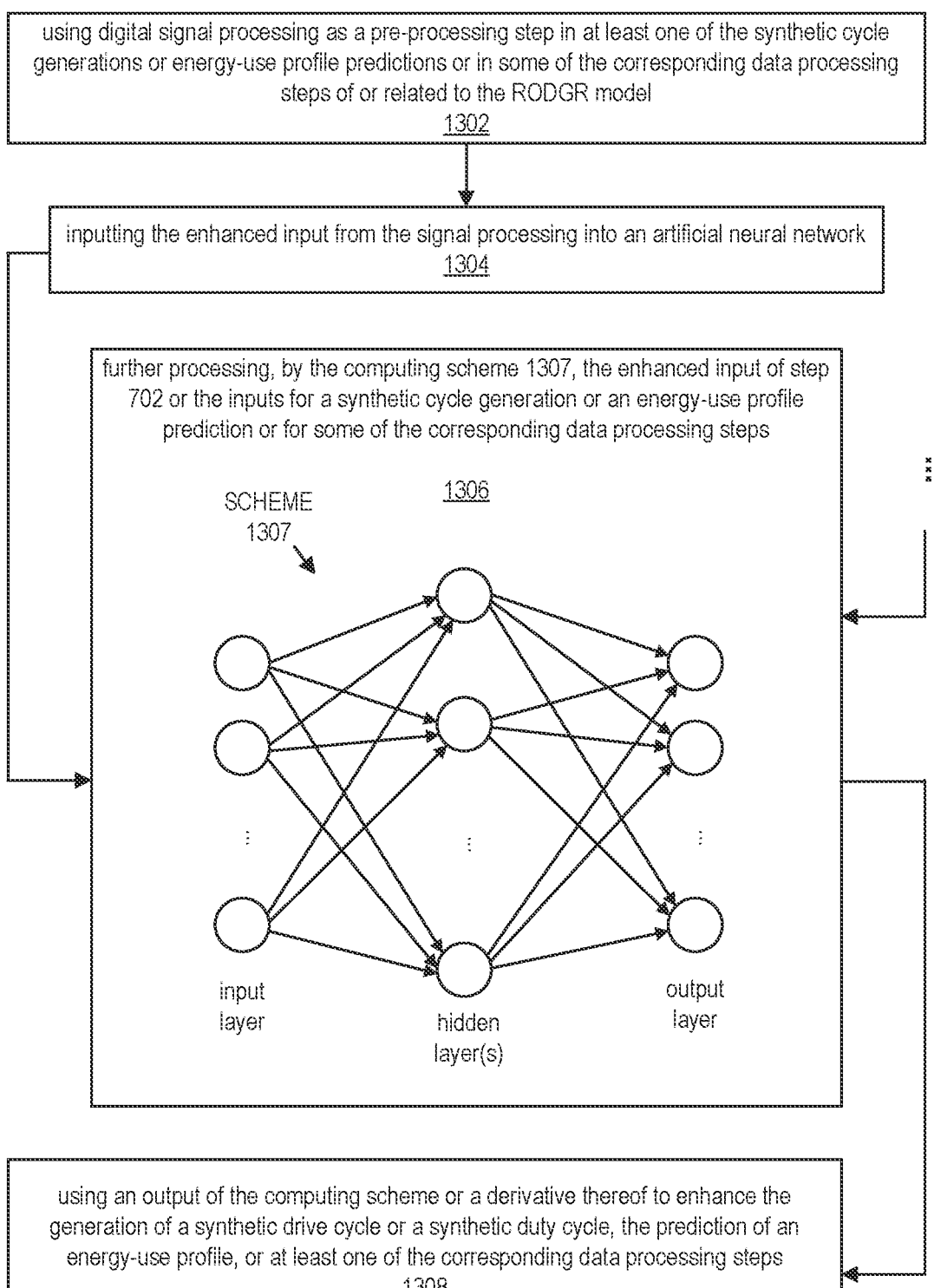

using digital signal processing as a pre-processing step in at least one of the synthetic cycle generations or energy-use profile predictions or in some of the corresponding data processing steps of or related to the RODGR model
1302 inputting the enhanced input from the signal processing into an artificial neural network
1304 further processing, by the computing scheme 1307, the enhanced input of step 702 or the inputs for a synthetic cycle generation or an energy-use profile prediction or for some of the corresponding data processing steps

SCHEME
1307

1306 input
layer hidden
layer(s)

output
layer using an output of the computing scheme or a derivative thereof to enhance the generation of a synthetic drive cycle or a synthetic duty cycle, the prediction of an energy-use profile, or at least one of the corresponding data processing steps
1308

FIG. 13

MACHINE LEARNING BASED GENERATION AND USE OF SYNTHETIC DRIVE CYCLES

TECHNICAL FIELD

The present disclosure relates to methods and systems using machine learning to train models for synthetic drive cycle generation and energy use prediction as well as using the trained models for synthetic drive cycle generation and energy use prediction to inform, manage, or control an end-user such as a person or a mobile machine.

BACKGROUND

It is known to track the energy use or consumption of a moving end-user such as a moving person or a mobile machine. There are many applications, used via smart devices such as smartphones and watches, which can track the energy use of a person. Also, there are many applications, used via automotive information systems, which can track the energy use of automobiles. And, such applications have also evolved to track the energy use of just about any type of mobile machine from miniaturized aircraft and watercraft (e.g., drones) to large industrial equipment and vehicles for construction, forestry, farming, security, military use, etc.

More recently, computing systems have evolved to compute solutions for very complex problems as well as make predictions based on extremely complex variables. And, such solutions are being adopted and modified for many different industries. Thus, eventually, evolved computing systems should be able to more accurately provide energy use predictions of mobile human and machine actors. Even though there are complex interactions and variables to be considered in making such predictions, eventually with improved computing software and hardware energy use predictions can be made with high accuracy. Thus, it would be advantageous to provide a computing system (and associated method) that overcomes or at least mitigates one or more problems associated with the prior art systems and considers complex interactions between various factors in energy use predictions.

SUMMARY

Described herein are techniques for using machine learning to generate and use synthetic drive cycles of mobile actors such as a moving person or a mobile machine, as well as technologies for using machine learning to generate and use synthetic duty cycles of mobile machines. The generation and use of a synthetic drive cycle for a moving person can include a drive cycle for a person moving from one place to another regardless of the complexity of the corresponding route and the complexity of other variables involved. The generation and use of a synthetic drive cycle or a synthetic duty cycle for a mobile machine can include a drive cycle or a duty cycle for a machine moving from one place to another, regardless of the complexity of the corresponding route and the complexity of other variables involved. Mobile machines can include any type of mobile machine for any industrial or consumer use. Mobile machines can include watercraft, aircraft, terrestrial vehicles, automobiles, robots, etc. The techniques disclosed herein provide specific technical solutions to at least overcome the technical problems related to synthetic drive or duty cycle generation and use as well as energy use prediction mentioned in the background section or other parts of the application as well as other technical problems not described herein but recognized by those skilled in the art.

In some embodiments, the techniques include technologies that use machine learning to generate and use synthetic drive cycles or synthetic duty cycles of mobile actors such as a moving person or a mobile machine. With respect to some embodiments, disclosed herein are computerized methods using machine learning to generate and use synthetic drive cycles or synthetic duty cycles of mobile actors. Also, with respect to some examples, disclosed herein are examples of a non-transitory computer-readable storage medium for carrying out technical operations of the computerized methods. The non-transitory computer-readable storage medium has tangibly stored thereon, or tangibly encoded thereon, computer-readable instructions that when executed by one or more devices (e.g., one or more personal computers or servers) cause at least one processor to perform a method for improved systems and methods for using machine learning to generate and use synthetic drive cycles or synthetic duty cycles of mobile actors.

For example, some embodiments include a method for using machine learning to generate and use synthetic drive cycles or synthetic duty cycles of mobile actors. In some cases, the method includes using such synthetic cycles for various purposes. In some examples, the method includes recording, by a computing system, actual drive cycles (e.g., see step 302 of method 300 shown in FIG. 3). Each of the actual drive cycles includes a series of data points representing the speed of a respective mobile machine versus time or distance while the respective mobile machine is moving through a respective area. The method also includes training, by the computing system, a route optimized drive cycle generator request (RODGR) model using the actual drive cycles (e.g., see step 304 of method 300). And, the method includes using, by the computing system, a selected path as input for the trained RODGR model to generate a synthetic drive cycle (e.g., see step 306 of method 300).

In some embodiments, such as where an end-user is a mobile machine, the actual and synthetic drive cycles are those of a machine. In some embodiments, such as where an end-user is a person, the actual and synthetic drive cycles or those of a person. For instance, in some examples, the method includes recording, by a computing system, actual human drive cycles (e.g., see step 902 of method 900 shown in FIG. 9). Each of the actual human drive cycles includes a series of data points representing the speed of a respective person versus time or distance while the respective person is moving through a respective area. The method also includes training, by the computing system, a RODGR model using the actual human drive cycles (e.g., see step 904 of method 900). The method also includes using, by the computing system, a selected path as input for the trained RODGR model to generate a synthetic human drive cycle (e.g., see step 906 of method 900). In some embodiments, such as where an end-user is a wearable or holdable smart device, the corresponding drive cycles include or are part of an exercise routine or cycle.

In some embodiments, such as where an end-user is a mobile machine, the actual and synthetic duty cycles are those of a machine. For instance, a method can include recording, by a computing system, actual drive cycles. Each of the actual drive cycles includes a series of data points representing the speed of a respective mobile machine versus time or distance while the respective mobile machine is moving through a respective area. Also, the method can include recording, by the computing system, actual duty cycles of auxiliary units of mobile machines. Each of the actual duty cycles includes a series of auxiliary data points representing auxiliary unit usage of a respective mobile machine versus time or distance while the respective mobile machine is moving through a respective area. Such a method can include training, by the computing system, a RODGR model using the actual drive cycles and the actual duty cycles. Also, the method can include using, by the computing system, a selected path as an input for the trained RODGR model to generate a synthetic drive cycle and a synthetic duty cycle.

The methods can also include predicting, by the computing system, an energy-use profile (e.g., see predicted energy-use information 118a or 118b) for the at least one route, based on a second model (e.g., see second model 116a or 116b) and one or more of a generated synthetic drive cycle or a generated synthetic duty cycle (e.g., see synthetic cycles 108a or 108b) used as an input for the second model (e.g., see step 1110 of method 1100 shown in FIG. 11). The method can also include using, by the computing system, the energy-use profile to at least partially control a mobile machine (e.g., see end-user device(s) 130) or to generate at least part of a user interface, such as a graphical user interface (GUI) or end-user interface 120 or end-user device (s) 130, according to data in the energy-use profile (e.g., see step 1112 of method 1100).

These and other important aspects of the invention are described more fully in the detailed description below. The invention is not limited to the particular methods and systems described herein. Other embodiments can be used and changes to the described embodiments can be made without departing from the scope of the claims that follow the detailed description. Within the scope of this application, it should be understood that the various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The present disclosure will be understood more fully from the detailed description given below and from the accompanying drawings of various example embodiments of the disclosure.

FIGS. 3 to 13 illustrate methods in accordance with some embodiments of the present disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications, and equivalents as will become apparent from consideration of the following detailed description and other parts of this disclosure.

Described herein are techniques for using machine learning to generate and use synthetic drive cycles of mobile actors such as a moving person or a mobile machine, as well as technologies for using machine learning to generate and use synthetic duty cycles of mobile machines. The generation and use of a synthetic drive cycle for a moving person can include a drive cycle for a person moving from one place to another regardless of the complexity of the corresponding route and the complexity of other variables involved. The generation and use of a synthetic drive cycle or a synthetic duty cycle for a mobile machine can include a drive cycle or a duty cycle for a machine moving from one place to another, regardless of the complexity of the corresponding route and the complexity of other variables involved. Mobile machines can include any type of mobile machine for any industrial or consumer use. Mobile machines can include watercraft, aircraft, terrestrial vehicles, automobiles, robots, etc. The techniques disclosed herein provide specific technical solutions to at least overcome the technical problems related to synthetic drive or duty cycle generation and use as well as energy use prediction mentioned in the background section or other parts of the application as well as other technical problems not described herein but recognized by those skilled in the art.

Figure 1:
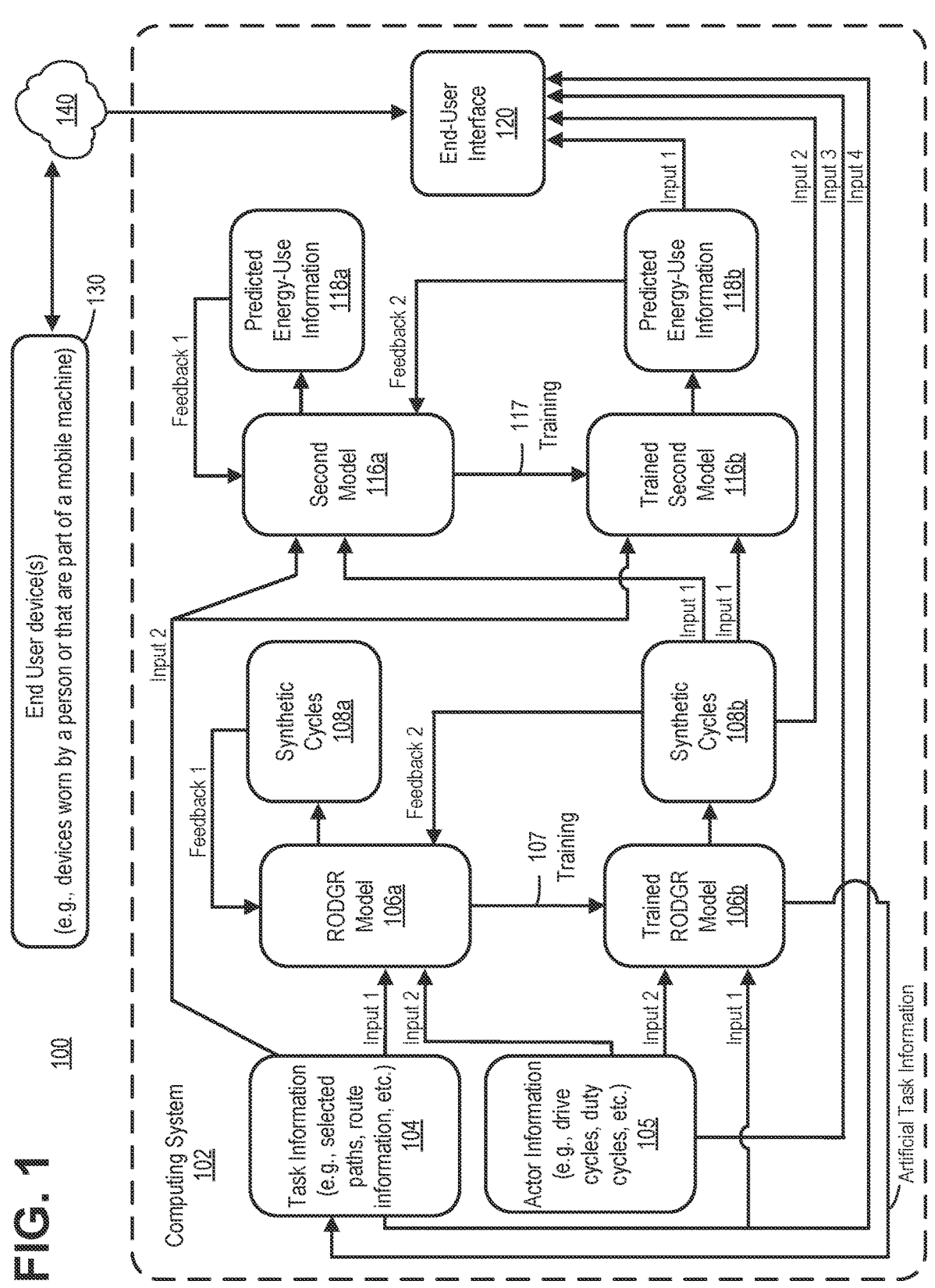
FIG. 1 illustrates an example technical solution to the example technical problems described herein, in accordance with some embodiments of the present disclosure.

FIG. 1 illustrates an example technical solution to the example technical problems described herein. The technical solution, shown in FIG. 1, can include or be a part of the techniques and technologies described herein (such as any one of the methods 300, 500, 700, 900, 1100, 1200, and 1300 shown in FIGS. 3, 5, 7, 9, 11, 12, and 13 respectively) and can provide specific technical solutions to at least overcome the technical problems mentioned in the background section or other parts of the application as well as other technical problems not described herein but recognized by those skilled in the art. FIG. 1 depicts a network 100, such as a computer network, within which a computing system 102 receives various inputs (e.g., see task information 104, actor information 105, synthetic cycles 108b (e.g., synthetic drive cycles and synthetic duty cycles), and predicted energy-use information 118b). These inputs and others can be received from different parts of the computing system 102 or other computing systems within the network 100.

As shown in FIG. 1, the computing system includes a first model, RODGR model 106a, which can be a deep-learning-based model, that is trained through various machine learning or deep learning techniques (e.g., see training 107), and the result of the training provides a trained RODGR model 106b. An initial or previous instance of the model (e.g., see RODGR model 106a) can be used to generate synthetic cycles 108a, including synthetic drive cycles and synthetic duty cycles. The synthetic cycles generated by such a model can provide feedback to that model to improve the model (e.g., see RODGR model 106a). Once the first model is trained (e.g., see trained RODGR model 106b), it can be used to generate new machine settings information, e.g., synthetic cycles 108b. The synthetic cycles 108b, which can include new speed-time information, can be used as feedback in the training of the first model (e.g., see RODGR model 106a and trained RODGR model 106b as well as the training 107).

Also, as shown, the computing system includes a second model 116a, which can be a deep-learning-based model that is trained through various machine learning or deep learning techniques (e.g., see training 117) and the result of the training provides a trained model 116*b*. An initial or previous instance of the model (e.g., see second model 116*a*) can be used to generate predicted energy-use information 118*a*. The predicted energy-use information generated by such a model can provide feedback to that model to improve the model (e.g., see second model 116*a*). Once the model is trained (e.g., see trained second model 116*b*), it can be used to generate new predicted energy-use information 118*b*. The new predicted energy-use information 118*b* can be used as feedback in the training of the model (e.g., see second model 116*a* and trained second model 116*b* as well as the training 117).

Further, as shown, the task information 104 can be used as input for the RODGR model 106*a* or the trained RODGR model 106*b* or, in other words, the first model or the first trained model. Also, the task information 104 can be used as input for the second model 116*a* and the trained second model 116*b*. Also, the task information 104 can be used as input for the end-user interface 120. When associated with a mobile machine, the task information 104 can include on-road route information, off-road route information, air or sea routing information, work implement information associated with construction work, military use, security details, farming, forestry, or the like. When associated with a person, the task information 104 can include information related to activities where a person is moving or performing work (such as manual labor, house chores, walking, swimming, running, hiking, climbing, and cycling) and routes or steps for such activities. The route information can include GPS trace information, elevation profiles, terrain classifications, stealth zones for mobile machines, for example.

As also shown, the actor information 105 can be used as input for the RODGR model 106*a* or the trained RODGR model 106*b* or, in other words, the first model or the first trained model. Also, the actor information 105 can be used as input for the end-user interface 120. The actor information 105 can include any information on a mobile machine or person. When associated with a mobile machine, the actor information 105 can include any information on the machine (such as identification information or make and model information) and information related to the movement or use of the mobile machine (such as predetermined, known or published energy or fuel consumption, energy or fuel efficiency, various acceleration and speed ranges, power outputs, etc.). The actor information 105 can also include information related to movement of the mobile machine such as mobile machine parameters, e.g., mass, aerodynamic drag coefficient, frontal area, drivetrain parameters such as parameters for a tracked vehicle model or wheeled vehicle model, powertrain parameters such as parameters for an engine map, motor torque curve, and battery capacity. The actor information 105 also includes recorded drive cycles and recorded duty cycles. For example, the actor information 105 can include actual drive cycles, wherein each of the actual drive cycles includes a series of data points representing the speed of a respective mobile machine versus time or distance while the respective mobile machine is moving through a respective area. For example, the actor information 105 can include actual duty cycles of auxiliary units of mobile machines, wherein each of the actual duty cycles includes a series of auxiliary data points representing auxiliary unit usage of a respective mobile machine versus time or distance while the respective mobile machine is moving through a respective area. In some embodiments, duty cycles of various parts of a mobile machine can be used as inputs and synthesized by RODGR model. In some examples, a user selects on a user interface implements or payloads that a vehicle is equipped with. Also, in embodiments where the actor is a person, the actor information 105 includes actual human drive cycles, wherein each of the actual human drive cycles includes a series of data points representing the speed of a respective person versus time or distance while the respective person is moving through a respective area.

For the purposes of this disclosure, it is to be understood that a duty cycle includes information on the proportions of time a part of a mobile machine spends in an active state compared to its total period of time recorded. For instance, a duty cycle can include information on respective auxiliary unit usages of the mobile machines versus time or distance that is recorded. And, it is to be understood that a drive cycle includes a series of data points representing the speed of a respective actor versus time or distance while the respective actor is moving through a respective area. Also, in some examples, a duty cycle can include information on respective auxiliary unit usages of the mobile machines versus time or distance that is recorded while the actual drive cycles are being recorded.

As also shown, the synthetic cycles 108*a* and 108*b*, which include synthetic drive cycles and synthetic duty cycles, are respective outputs of RODGR model 106*a* and the trained RODGR model 106*b*. The synthetic cycles 108*a* and 108*b* can also be used as feedback for the RODGR model 106*a* in its training 107 to produce trained RODGR model 106*b*. Also, the synthetic cycles 108*b* can be used as input for the second model 116*a* or the trained second model 116*b*. Also, the synthetic cycles 108*a* and 108*b* can be used as input for the end-user interface 120. The synthetic cycles 108*a* and 108*b* can include tables, graphs, non-graphical data structures, and other forms of associated data or information that can show relationships between speed and time measurements associated with the actor or end-user of the system, such as the person or the mobile machine. For the purposes of this disclosure, it is to be understood that a duty cycle includes information on the proportions of time a part of a mobile machine spends in an active state compared to its total period of time recorded. For instance, a duty cycle can include information on respective auxiliary unit usages of the mobile machines versus time or distance that is recorded. And, it is to be understood that a drive cycle includes a series of data points representing the speed of a respective actor versus time or distance while the respective actor is moving through a respective area. Also, in some examples, a duty cycle can include information on respective auxiliary unit usages of the mobile machines versus time or distance that is recorded while the actual drive cycles are being recorded.

As also shown, the predicted energy-use information 118*a* and 118*b* are respective outputs of second model 116*a* and the trained second model 116*b*. The predicted energy-use information 118*a* and 118*b* can also be used as feedback for the second model 116*a* in its training 117 to produce trained second model 116*b*. Also, the predicted energy-use information 118*b* can be used as input for the end-user interface 120. The predicted energy-use information 118*a* and 118*b* can include tables, graphs, non-graphical data structures, and other forms of associated data or information that shows relationships between energy use and different tasks or operations performed by the actor or end-user of the system, such as the person or the mobile machine. The predicted energy-use information 118*a* and 118*b* can include determined average energy consumption or fuel efficiency values, for example.

Also, as shown, the end-user interface 120, which can receive the four inputs of task information, actor information, speed-time information, and predicted energy-use information, can use such information to at least partially control a mobile machine or to generate at least part of a user interface (UI) such as a GUI. For example, the interface 120 can provide the aforementioned functionality according to data in the energy-use profile that can include predicted energy-use information. Also, secondary information, such as the task information, actor information, speed-time information, actual and synthetic drive cycles, and actual and synthetic duty cycles, can be used in combination with the energy-use profile, by the interface 120, to provide the aforesaid functionality.

Not depicted, in some embodiments, the computing system 102 can be a part of one or more end-user devices (e.g., see one or more end-user devices 130). As shown in FIG. 1, in some examples, the computing system 102 is communicatively coupled or connected with one or more end-user devices (e.g., see the end-user device(s) 130) via network 140 (which can be a part of network 100 as depicted). In some embodiments, the computing system 102 and the inputs and outputs of the computing system are part of a remote system in that the remote system is physically and geographically separated from the end-user device(s) and communicates with a system or controller of the device(s) over a telecommunications or computer network (such as network 140). As shown, in some cases, the communications are via an end-user interface 120, which can include or be a part of a network communications interface. The end-user devices(s) (such as device(s) 130) can include a mobile machine or a device worn or held by a person or a part of a mobile machine or a part of a worn or held device.

The computing system 102 can include electronics such as one or more controllers, sensors, busses, and computers. The computing system 102 includes at least a processor, memory, and a communication interface and can include one or more sensors, which can make a mobile machine or a worn or held device an individual computing device when the mobile machine or the worn or held device includes the computing system. In the case of the network 140 including the Internet, the end-user device(s) 130 as well as the computing system 102 can be considered an Internet of Things (IoT) device. Also, in some embodiments, the computing system 102 or the end-user device(s) 130 can be a part of a cloud computing system. The computing system 102 or the end-user device(s) 130 can include both electronic hardware and software that can integrate between the systems of the computing system and the end-user device(s). And, such hardware and software (such as controllers and sensors and other types of electrical and/or mechanical devices) can be configured to communicate with a remote computing system via the communications network 140.

In some embodiments, a mobile machine (e.g., see end-user device(s) 130) can include any type of machine that moves. Also, mobile machines described herein include mobile machines that include various sensors and that have trackable attributes that can be tracked via such sensors. Mobile machines can include any type of vehicle or machine used for the transport of people or things such as raw materials, payloads, or goods. For instance, mobile machines can include any type of vehicle (e.g., motorcycle, car, bus, bicycle, etc.), automobile, train, watercraft, or aircraft used for the transport of people or objects. Also, mobile machines can include miniaturized machines from miniaturized aircraft and watercraft (e.g., drones) to robots and other types of electro-mechanical equipment performing fine-tuning and motion. Also, mobile machines can include heavy machinery, equipment, and vehicles for military use, construction, farming, forestry, and security details, for example. Mobile machines can include any type of mobile machine for any industrial or consumer use. Mobile machines can include watercraft, aircraft, terrestrial vehicles, automobiles, robots, etc.

In some embodiments, a worn or held device (e.g., see the end-user device(s) 130) can include smart devices such as smartphones and smartwatches. A worn or held device can also include jewelry, other types of worn or held accessories, medical devices, and clothing or elements of clothing that include a computing system or a part of a computing system or a part that can interact with a computing system. A worn or held device can also include virtual-reality headsets and smart eyewear, for example. Furthermore, held devices can include other types of electronics that a human user can hold while moving, such as mobile devices and phones, tablet computers, and laptops.

The network 140 can include one or more local area networks (LAN(s)) and/or one or more wide area networks (WAN(s)). In some embodiments, the network 140 includes the Internet and/or any other type of interconnected communications network. The network 140 can also include a single computer network or a telecommunications network. More specifically, in some embodiments, the network 140 includes a local area network (LAN) such as a private computer network that connects computers in small physical areas, a wide area network (WAN) to connect computers located in different geographical locations, and/or a middle area network (MAN) to connect computers in a geographic area larger than that covered by a large LAN but smaller than the area covered by a WAN.

At least each shown component of the network 100 (including computing system 102, end-user device(s) 130, or network 140 depending on the embodiment) can be or include a computing system that includes memory that includes media. The media includes volatile memory components, non-volatile memory components, or a combination thereof. In general, in some embodiments, each of the computing systems includes a host system that uses memory. For example, the host system writes data to the memory and reads data from the memory. The host system is a computing device that includes a memory and a data processing device. The host system includes or is coupled to the memory so that the host system reads data from or writes data to the memory. The host system is coupled to the memory via a physical host interface. The physical host interface provides an interface for passing control, address, data, and other signals between the memory and the host system.

Figure 2:
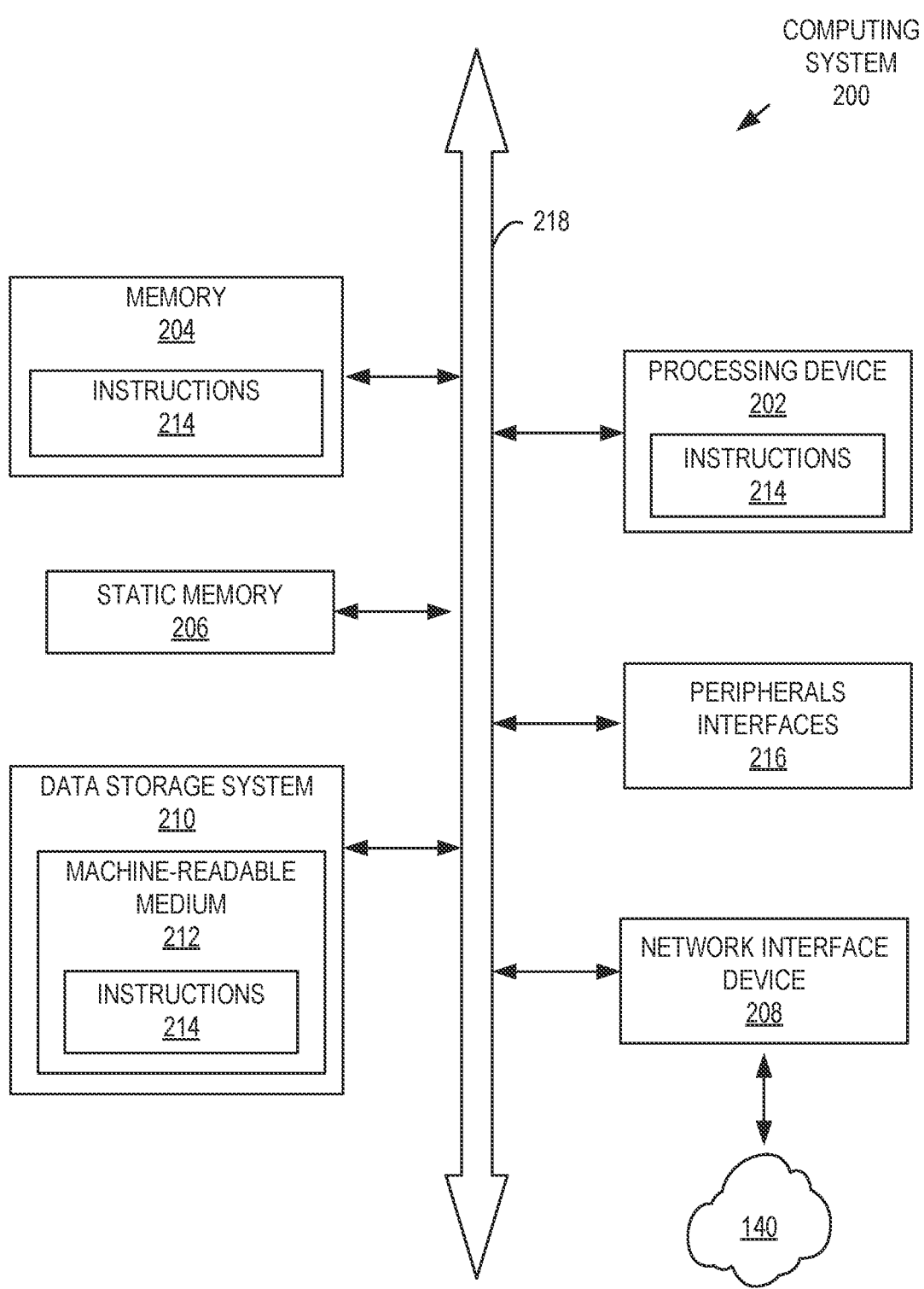
FIG. 2 illustrates a block diagram of example aspects of a computing system, in accordance with some embodiments of the present disclosure.

FIG. 2 illustrates a block diagram of example aspects of a computing system 200 that can implement the technical solution shown in FIG. 1 or each main part of the solution. Also, FIG. 2 illustrates parts of the computing system 200 within which a set of instructions are executed for causing a machine (such as a computer processor or processing device 202) to perform any one or more of the methodologies discussed herein performed by a computing system (e.g., see the method steps of the methods 300, 500, 700, 900, 1100, 1200, and 1300 shown in FIGS. 3, 5, 7, 9, 11, 12, and 13 respectively). In some embodiments, the computing system 200 operates with additional computing systems to provide increased computing capacity in which multiple computing systems operate together to perform any one or more of the methodologies discussed herein that are performed by a computing system.

In some embodiments, the computing system 200 corresponds to a host system that includes, is coupled to, or utilizes memory or is used to perform the operations performed by any one of the computing systems described herein. In some embodiments, the machine is connected (e.g., networked) to other machines in a LAN, an intranet, an extranet, or the Internet. In some embodiments, the machine operates in the capacity of a server in a client-server network environment, as a peer machine in a peer-to-peer (or distributed) network environment, or as a server in a cloud computing infrastructure or environment. In some embodiments, the machine is a personal computer (PC), a tablet PC, a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein performed by computing systems.

The computing system 200 includes a processing device 202, a main memory 204 (e.g., read-only memory (ROM), flash memory, dynamic random-access memory (DRAM), etc.), a static memory 206 (e.g., flash memory, static random-access memory (SRAM), etc.), and a data storage system 210, which communicate with each other via a bus 218. The processing device 202 represents one or more general-purpose processing devices such as a microprocessor, a central processing unit, or the like. More particularly, the processing device can include a microprocessor or a processor implementing other instruction sets, or processors implementing a combination of instruction sets. Or, the processing device 202 is one or more special-purpose processing devices such as an application-specific integrated circuit (ASIC), a field programmable gate array (FPGA), a digital signal processor (DSP), a network processor, or the like. The processing device 202 is configured to execute instructions 214 for performing the operations discussed herein performed by a computing system. In some embodiments, the computing system 200 includes a network interface device 208 to communicate over a communications network. Such a communications network can include one or more local area networks (LAN(s)) and/or one or more wide area networks (WAN(s)). In some embodiments, the communications network includes the Internet and/or any other type of interconnected communications network. The communications network can also include a single computer network or a telecommunications network.

The data storage system 210 includes a machine-readable storage medium 212 (also known as a computer-readable medium) on which is stored one or more sets of instructions 214 or software embodying any one or more of the methodologies or functions described herein performed by a computing system. The instructions 214 also reside, completely or at least partially, within the main memory 204 or within the processing device 202 during execution thereof by the computing system 200, the main memory 204 and the processing device 202 also constituting machine-readable storage media. While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that causes the machine to perform any one or more of the methodologies of the present disclosure performed by a computing system. The term "machine-readable storage medium" shall accordingly be taken to include solid-state memories, optical media, or magnetic media.

Also, as shown, the computing system 200 includes peripheral interfaces 216 (which can include interfaces for a display and other types of user-interface devices, as well as interfaces for various types of sensors, controllers, and any other type of hardware that interacts with a compu4ting system), and, for example, the peripheral interfaces 216 can implement at least partially any functionality corresponding to any one of the user-interface devices, sensors, or controllers disclosed herein. For example, the peripheral interfaces 216 can include the end-user interface 120 shown in FIG. 1, or it can implement the functionality of the end-user interface. Also, for example, the peripheral interfaces 216 can include the one or more end-user devices 130, which can be any type of user-interface device or UI that can be worn or held by a person (e.g., a smartwatch or phone) or any type of device that can be attached to or is a part of a mobile machine such as any type of sensor or controller of a mobile machine. Also, in some examples, the peripheral interfaces 216 can implement at least partially any of the functionality corresponding to the one or more end-user devices 130, which can be any type of user-interface device or UI that can be worn or held by a person or any type of device that can be attached to or is a part of a mobile machine such as any type of sensor or controller of a mobile machine.

User-interface devices or any UI described herein, can include any space or equipment where interactions between humans and machines occur. A UI described herein allows the operation and control of the machine from a human user, while the machine simultaneously provides feedback information to the user. Examples of a user interface, or UI device include the interactive aspects of computer operating systems (such as graphical user interfaces), machinery operator controls, and process controls.

FIGS. 3 to 13 illustrate methods in accordance with some embodiments of the present disclosure. Methods 300, 500, 700, 900, 1100, 1200, and 1300 of the corresponding FIGS. 3, 5, 7, 9, 11, 12, and 13 are performed by any one of the computing systems described herein (e.g., see computing system 102 or 200 depicted in FIGS. 1 and 2 respectively). In some systems of the technologies disclosed herein, any steps of embodiments of the methods described herein are implementable by executing instructions corresponding to the steps, which are stored in memory (such as the instructions 214).

As shown in FIG. 3, method 300 begins with step 302, which includes recording, by a computing system (e.g., see computing system 102 shown in FIG. 1 or computing system 200 shown in FIG. 2) actual drive cycles (e.g., see actor information 105). Each of the actual drive cycles includes a series of data points representing the speed of a respective mobile machine versus time or distance while the respective mobile machine is moving through a respective area. The data points of the route information can be recorded at the corresponding data points of the actual drive cycles. In some cases, the respective areas are part of a given path. And, the respective areas can be a part of a given path. Also, in some examples, a set of parameters of the given path are unknown and artificially generated using the trained RODGR model, and a second set of parameters of the given path are pre-recorded and known. In some embodiments, step 302 also includes recording, by the computing system, route information corresponding to the actual drive cycles. The route information can include information on respective areas that respective mobile machines are moving through while the actual drive cycles are recorded.

Route information can be a part of the task information 104 that can include on-road route information, off-road route information, air or sea routing information, work implement information associated with construction work, military use, security details, farming, forestry, or the like. When associated with a person, the task information 104 or route information can include information related to activities where a person is moving or performing work (such as manual labor, house chores, walking, swimming, running, hiking, climbing, and cycling) and routes or steps for such activities. The route information can include GPS trace information, elevation profiles, terrain classifications, stealth zones for mobile machines, for example.

The method 300 continues with step 304, which includes training, by the computing system, a RODGR model using the actual drive cycles. In some cases, the RODGR model is a first model of a multiple model system. In some embodiments, as shown in FIG. 3, the method 300 can include using, by the computing system, a selected path as input for an untrained RODGR model to generate a synthetic drive cycle (see step 306b).

The method 300 continues with step 306, which includes using, by the computing system, a selected path as input for the trained RODGR model to generate a synthetic drive cycle. In some embodiments, the selected path is selected from a map displayed by a graphical user interface. Also, not depicted, in some examples, step 302 can include driving the mobile machines through at least part of the selected path during the recording of the actual drive cycles.

In some embodiments, actual or synthetic drive or duty cycles can also be used as input for the trained RODGR model to generate synthetic drive cycles or to generate synthetic duty cycles. Also, in some embodiments, the step 306 includes using, by the computing system, the selected path and the route information as inputs for the trained RODGR model to generate the synthetic drive cycle or even synthetic duty cycles in some examples. Also, as shown in FIG. 5, some embodiments include the additional use of record duty cycles as inputs for the trained RODGR to generate the synthetic drive cycle.

For the purposes of this disclosure, it is to be understood that a duty cycle includes information on the proportions of time a part of a mobile machine spends in an active state compared to its total period of time recorded. For instance, a duty cycle can include information on respective auxiliary unit usages of the mobile machines versus time or distance that is recorded. And, it is to be understood that a drive cycle includes a series of data points representing the speed of a respective actor versus time or distance while the respective actor is moving through a respective area. Also, in some examples, a duty cycle can include information on respective auxiliary unit usages of the mobile machines versus time or distance that is recorded while the actual drive cycles are being recorded.

In some cases, the synthetic drive cycle, generated in step 306, or the synthetic duty cycle, is physics-compliant at each data point of a series of data points defining the synthetic drive cycle (e.g., see an example of step 306 shown in FIG. 4) or the synthetic duty cycle. In some examples, the generation of the synthetic drive cycle by the RODGR model at step 306 includes dividing a route in the selected path into continuous segments where similar route information is expected (e.g., see step 402 shown in FIG. 4). The same can be done for generating the synthetic duty cycle too (e.g., see step 802 shown in FIG. 8). Step 306 can also include the generation of the synthetic drive cycle by the RODGR model including selecting a control speed value for each segment of the continuous segments (e.g., see step 404 shown in FIG. 4) and checking each control speed value for physics compliance (e.g., see step 406). Analogous steps can also be performed in generation of the synthetic duty cycle (e.g., see steps 804 and 806). In some embodiments, the segmentation of the path is determined by stop-and-go points or points where terrain changes. Sometimes such points may overlap and be discontinuous. In some examples, the selected path is segmented based on similar route information.

In some embodiments, the computing system checks to make sure that the acceleration of a mobile machine at each time step is within the maximum acceleration it can achieve given the state of a battery or another power source, speed and torque of the motor, or traction available based on the tire or track and the terrain type. In some embodiments, the segments can lack a select control speed value. In such examples, the segments can have some fundamental base profiles of speed change, such as one segment could be a monotonous increase in speed while another could be a monotonous decrease. In some examples, only each time or distance point is associated with a single speed. In such cases, each of these points can be checked for compliance with a physics model. In some cases, the speed value is replaced with a speed profile providing a discrete change in speed.

In some embodiments, generalized additive models are used to generate the synthetic cycles between segments, and in such examples, a segment can correspond to a period of time when the vehicle is within the same terrain type or between stopping points on a route.

In some embodiments, step 306 includes using deep learning with the RODGR model to enhance the generation of the synthetic drive cycle. Also, deep learning can be used with the RODGR model to enhance generation of the synthetic duty cycle. Also, in some examples, the training of the RODGR model at step 304 (or at step 704 shown in FIG. 7) can include using deep learning to train the model. Also, see method 1300 shown in FIG. 13, which can include deep learning.

The method 300 also continues with step 308, which includes using, by the computing system or a second computing system such as a control system, the synthetic drive cycle to at least partially control a mobile machine or to generate a graphical user interface according to data in the synthetic drive cycle. In some embodiments, the actual drive cycles include drive cycles of different mobile machines. And, in some embodiments, the synthetic drive cycles include drive cycles for different mobile machines. The mobile machines can include watercraft, aircraft, terrestrial vehicles, automobiles, or robots (e.g., see end-user device(s) 130). Also, the mobile machines described herein include mobile machines that include various sensors and that have trackable attributes that can be tracked via such sensors. Mobile machines can include any type of vehicle or machine used for the transport of people or things such as raw materials, payloads, or goods. For instance, mobile machines can include any type of vehicle (e.g., motorcycle, car, bus, bicycle, etc.), automobile, train, watercraft, or aircraft used for the transport of people or objects. Also, mobile machines can include miniaturized machines from miniaturized aircraft and watercraft (e.g., drones) to robots and other types of electro-mechanical equipment performing fine-tuning and motion. Also, mobile machines can include heavy machinery, equipment, and vehicles for military use, construction, farming, forestry, and security details, for example. Mobile machines can include any type of mobile machine for any industrial or consumer use.

As shown in FIG. 5, some embodiments include the additional use of recorded duty cycles as inputs for the trained RODGR to generate a synthetic drive cycle. FIG. 5 shows that method 500 includes the steps 302 and 304 as well as steps for recording actual duty cycles and generating the synthetic drive cycle via the RODGR model with the additional input of the recorded duty cycles. For example, method 500 includes, at step 502 recording, by the computing system, actual duty cycles of auxiliary units of the mobile machines corresponding to the actual drive cycles. The actual duty cycles include information on respective auxiliary unit usages of the mobile machines versus time or distance that is recorded while the actual drive cycles are being recorded. In some embodiments, data points of the actual duty cycles are recorded at the corresponding data points of the actual drive cycles. Also, method 500 includes, at step 504, using, by the computing system, the selected path and the actual duty cycles along with the actual drive cycles as inputs for the trained RODGR model to generate the synthetic drive cycle. Method 500 also includes step 308, including using the synthetic drive cycle to at least partially control a mobile machine or to generate a graphical user interface according to data in the synthetic drive cycle.

FIG. 6 shows that step 504 can include, in the generation of the synthetic drive, dividing a route in the selected path into continuous segments where similar route information or auxiliary unit usages are expected (at step 602). Also, step 504 can include selecting a control speed value or auxiliary unit usage value for each segment of the segments (at step 604) and checking each control speed value or auxiliary unit usage value for physics compliance (at step 606). In some embodiments, the segmentation of the path is determined by stop-and-go points or points where terrain changes. Sometimes such points may overlap and be discontinuous. In some examples, the selected path is segmented based on similar route information. In some examples, the computing system can use spline functions and physics corrections using parameters related to mobile machine parts or even human parts, resistances such as water, ground, or rolling resistances for example, aerodynamic drag, etc.

In some embodiments, the segments can lack a select control speed value. In such examples, the segments can have some fundamental base profiles of speed change, such as one segment could be a monotonous increase in speed while another could be a monotonous decrease. In some examples, only each time or distance point is associated with a single speed. In such cases, each of these points can be checked for compliance with a physics model. In some cases, the speed value is replaced with a speed profile providing a discrete change in speed.

In addition to using recorded duty cycles as input into the trained RODGR model to generate synthetic drive cycles, recorded duty cycles can also be used to train the RODGR model to generate synthetic drive cycles or synthetic duty cycles. As shown in FIG. 7, and similar to method 300, method 700 begins with step 302, which includes recording, by a computing system (e.g., see computing system 102 shown in FIG. 1 or computing system 200 shown in FIG. 2) actual drive cycles (e.g., see actor information 105). Each of the actual drive cycles includes a series of data points representing the speed of a respective mobile machine versus time or distance while the respective mobile machine is moving through a respective area.

Different from method 300, the method 700 additionally begins with recording, by the computing system, actual duty cycles of auxiliary units of mobile machines. Each of the actual duty cycles includes a series of auxiliary data points representing auxiliary unit usage of a respective mobile machine versus time or distance while the respective mobile machine is moving through a respective area. Also, different from method 300, method 700 continues with step 704 that includes training, by the computing system, a RODGR model using the actual drive cycles and the actual duty cycles. Also, method 700 continues with step 706 that includes using, by the computing system, a selected path as an input for the trained RODGR model to generate a synthetic drive cycle and a synthetic duty cycle. And, method 700 includes, at step 708, using the synthetic drive cycle or the synthetic duty cycle to at least partially control a mobile machine or to generate a graphical user interface according to data in the synthetic drive cycle or the synthetic duty cycle, respectively. In some examples, multiple synthetic duty cycles are generated and used for different parts of a mobile machine (such as parts that have recorded duty cycles inputted into RODGR).

FIG. 8 shows, in the generation of the synthetic drive cycle or the synthetic duty cycle of step 706, that the computing system can divide a route in the selected path into continuous segments where similar route information or auxiliary unit usages are expected respectively (at step 802). Also, step 706 can include selecting a control speed value or auxiliary unit usage value for each segment of the segments (at step 804) and checking each control speed value or auxiliary unit usage value for physics compliance (at step 806). In some embodiments, the segmentation of the path is determined by stop-and-go points or points where terrain changes. Sometimes such points may overlap and be discontinuous. In some examples, the selected path is segmented based on similar route information.

In some embodiments, the segments can lack a select control speed value. In such examples, the segments can have some fundamental base profiles of speed change, such as one segment could be a monotonous increase in speed while another could be a monotonous decrease. In some examples, only each time or distance point is associated with a single speed. In such cases, each of these points can be checked for compliance with a physics model. In some cases, the speed value is replaced with a speed profile providing a discrete change in speed.

In some embodiments, the method 700 can include recording, by the computing system, route information corresponding to the actual drive cycles and the actual duty cycles. The route information can include information on respective areas that respective mobile machines are moving through while the actual drive and duty cycles are recorded. Also, the method 700 can include using, by the computing system, the selected path and the route information as inputs for the trained RODGR model to generate the synthetic drive cycle and the synthetic duty cycle (such as at step 706).

In some embodiments, synthetic route information can be generated by the RODGR model. And, such information can be a part of the task information 104 that can include on-road route information, off-road route information, air or sea routing information, work implement information associated with construction work, military use, security details, farming, forestry, or the like. When associated with a person, the task information 104 or route information can include information related to activities where a person is moving or performing work (such as manual labor, house chores, walking, swimming, running, hiking, climbing, and cycling) and routes or steps for such activities. The route information can include GPS trace information, elevation profiles, terrain classifications, stealth zones for mobile machines, for example. All of this information can be generated by the RODGR for use as input or feedback in generation of the cycles or energy-use prediction.

In some embodiments, the recorded drive cycles are cycles of human actors instead of machine actors. For example, method 900 shows the recording of human drive cycles and the use of such cycles to train and use a RODGR model. As shown in FIG. 9, method 900 begins with step 902, which includes recording, by a computing system (e.g., see computing system 102 shown in FIG. 1 or computing system 200 shown in FIG. 2) actual human drive cycles (e.g., see actor information 105). Each of the actual human drive cycles includes a series of data points representing the speed of a respective person versus time or distance while the respective person is moving through a respective area. At step 904, the method 900 includes training, by the computing system, a RODGR model using the actual human drive cycles. At step 906, the method 900 includes using, by the computing system, a selected path as input for the trained RODGR model to generate a synthetic human drive cycle. At step 908, the method 900 includes using, by the computing system, the synthetic human drive cycle to generate a graphical user interface according to data in the synthetic human drive cycle. As shown by FIG. 10, step 906 can include, in the generation of the synthetic human drive cycle, dividing a route in the selected path into continuous segments where similar route information is expected (at step 1002). Also, step 906 can include selecting a control speed value for each segment of the segments (at step 1004) and checking each control speed value for physics compliance (at step 1006).

FIG. 11 shows the use of the output of methods 300, 500, 700, or 900 to predict and use an energy-use profile. As shown in FIG. 11, the method 1100 can include the method 300, 500, 700, or 900 (e.g., see respective steps 1102, 1104, 1106, and 1108). Respective outputs of each method can then be selected to be used as inputs for a second model that can predict the energy-use profile. At step 1110, the method 1100 includes predicting, by the computing system, an energy-use profile for at least one path based on a second model and the synthetic drive cycle or the synthetic duty cycle used as one or more inputs for the second model or based on the second model and the synthetic human drive cycle used as an input for the second model. At step 1112, the method 1100 includes using, by the computing system, the energy-use profile to at least partially control a mobile machine or to generate a graphical user interface according to data in the energy-use profile.

As shown in FIG. 12, a method 1200 includes repeating one or more of the method 300, the method 500, the method 700, method 900, and method 1100 in a statistical analysis to generate one or more statistical distributions of the synthetic cycles or the energy-use profile (at step 1202). And, at step 1204, the method 1200 can include using, by the computing system, a statistical distribution of one of the synthetic cycles or the energy-use profile to at least partially control a mobile machine or to generate at least part of a GUI according to data in that cycle or the energy-use profile. Also, at step 1206, the method 1200 can include profile1 using, by the computing system, a statistical distribution of one of the synthetic cycles or the energy-use profile to generate a distribution of a probability of completion corresponding to the statistical distribution. For example, in some embodiments, a method can include repeating the generation of the synthetic drive cycle in a statistical analysis to generate a statistical distribution of the synthetic drive cycle and using at least part of the statistical distribution of the synthetic drive cycle to at least partially control a mobile machine or to generate a graphical user interface according to the statistical distribution of the synthetic drive cycle. And, for instance, in some embodiments, a method can include repeating the generation of the synthetic drive cycle in a statistical analysis to generate a statistical distribution of the synthetic drive cycle, predicting, by the computing system, an energy-use profile for at least one path, based on a second model and the statistical distribution used as an input for the second model, and using, by the computing system, the energy-use profile to at least partially control a mobile machine or to generate a graphical user interface according to data in the energy-use profile. The duty cycle can be used in an analogous way too with or without the use of the drive cycle.

In some cases, the repeating of the generation of the synthetic cycles or the energy-use profiles can be a part of a Monte Carlo simulation for statistical analysis. The Monte Carlo simulation can be used to generate a statistical distribution of the synthetic cycles or the energy-use profiles. The computing system can use the statistical distribution of the synthetic cycles or the energy-use profiles to at least partially control a mobile machine or to generate at least part of a GUI, according to data in the statistical distribution. And, the computing system can use the statistical distribution of the synthetic cycles or the energy-use profiles to generate a distribution of a probability of completion corresponding to the statistical distribution. In some embodiments, the computing system can use the distribution of the probability of completion to control a mobile machine or to generate at least part of a UI, such as a GUI, according to data in the distribution of the probability of completion.

Referring back to FIG. 3, the method 300 with step 304 can include training, by the computing system, a RODGR model using the actual drive cycles. In some cases, the RODGR model is a first model of a multiple model system. As mentioned herein, a second model of the system can be used to predict or generate energy-use information (e.g., see information 118a and 118b shown in FIG. 1) using the output of the first model (e.g., see cycles 108a and 108b). In some embodiments, the first model (or the RODGR model 106a) is a trained first model (e.g., see training 107 and the trained RODGR model 106b). And, in some embodiments, the second model is a trained second model (e.g., see training 117 and the trained second model 116b). Training can occur through machine learning. And, in some examples, machine learning can include deep learning. In some embodiments, using machine learning or deep learning to train models for energy use prediction as well as using the trained models for energy use prediction to inform, manage, or control an end-user such as a person or a mobile machine involves the application of neural network architectures to analyze and predict the energy use based on historical data (e.g., see scheme 1307 shown in FIG. 13, which includes an artificial neural network or ANN).

In some cases, by leveraging machine or deep learning, a model can capture complex patterns and dependencies within the various types of information described herein (e.g., see task information 104, actor information 105, synthetic cycles 108b, and predicted energy-use information 118b), allowing for more efficient and effective energy use prediction, which in some instances can be done in real time when the end-user is performing a task or in route. Such functionality can be provided through method 300 shown in FIG. 3 as well as the other methods described herein when the models have been trained with machine or deep learning techniques. Also, in some examples, the training of the models and the use of such trained models is provided, at least inferentially, through method 300 shown in FIG. 3 well as the other methods described herein that include at least the steps of method 300 and the use of trained models trained through machine or deep learning. Furthermore, some embodiments include combinations of steps from at least method 300, whether or not the models were trained. And, some examples include steps from the other methods described herein that include steps from the method 300.

In addition to machine learning, the computing system can use spline functions and physics corrections using parameters related to mobile machine parts or even human parts, resistances such as water, ground, or rolling resistances for example, aerodynamic drag, etc.

In some embodiments, the first model, or the RODGR model, is trained through at least one machine learning technique such as a generalized additive model or an autoregressive model. Also, computing schemes such as artificial neural networks, recurrent neural networks, and convolution neural networks can be used with the first model. Also, LSTM (Long Short-Term Memory) networks can be used. In some cases, the first model, or the RODGR model, includes a pre-processing step based on digital signal processing wherein any one or more of the inputs for the first model or derivatives thereof are pre-processed via digital signal processing, e.g., see step 1302 of method 1300 shown in FIG. 13. In such cases and others, at least part of the pre-processed data of the first model can be inputted into an artificial neural network (ANN) to further enhance the data for the determination of the synthetic cycles or energy use information, e.g., see steps 1304 and 1306 of method 1300. Also, in such examples and others, the output of the ANN or a derivative thereof can be used to enhance one or more of the inputs for the determination of the synthetic cycles or energy use information, e.g., see step 1308 of method 1300.

In some embodiments, the second model is trained through at least one machine learning technique such as an ensemble learning model, a Bayesian model, or a regression model like a random forest or gradient descent model). Also, computing schemes such as artificial neural networks and convolution neural networks can be used with the second model. Also, recurrent neural networks (like LSTM networks) can be used. In some cases, the second model includes a pre-processing step based on digital signal processing wherein any one or more of the inputs for the second model or derivatives thereof are pre-processed via digital signal processing, e.g., see step 1302 of method 1300 shown in FIG. 13. In such cases and others, at least part of the pre-processed data of the first model can be inputted into an ANN to further enhance the data for the determination of the synthetic cycles or energy use information, e.g., see steps 1304 and 1306 of method 1300. Also, in such examples and others, the output of the ANN or a derivative thereof can be used to enhance one or more of the inputs for the synthetic cycles or energy use information, e.g., see step 1308 of method 1300.

In some cases where the end user is a mobile machine, the mobile machine is a vehicle. And, in such cases and others, the synthetic cycles or energy use information can be for a mobile machine, a vehicle, or a person. When the synthetic cycles or energy use information is for a machine or vehicle, the synthetic cycles or energy use information can include information related to the use of an internal combustion engine, an electric motor, or any other type of machine designed to convert one or more forms of energy into mechanical energy or heat energy as well as the use of a primary or auxiliary system. In some embodiments, the synthetic cycles or energy use information can include information related to driving a mobile machine or vehicle over the ground, in water, or the air. Also, in some cases, the synthetic cycles or energy use information can include information related to using implements of the mobile machine that are used for tasks beyond the driving or flying of the mobile machine or the vehicle. Such tasks can include heating or cooling the machine, using electromagnetic communications or navigation systems, operating weapons systems, operating farm implements, using vision systems, or any other mobile machine auxiliary energy demand. Also, such tasks can include cooling the vehicle, using RADAR or radio systems, using weapons systems, and using implement systems such as those used in construction, forestry, farming, security, military use, etc. Also, energy consumption by computing resources on the mobile machine can be part of a task.

In some embodiments, generating one or more of the synthetic cycles or energy use information takes into account one or more variables related to a terrain or body of water with varying features and ways of moving through the terrain or body of water (e.g., variables can include friction, slippage, etc.). In some embodiments, the task profile includes information related to the one or more variables related to related to a terrain and/or body of water with varying features and ways of moving through the terrain and/or body of water (e.g., variables can include slippage, etc.).

In some embodiments, when the synthetic cycles or energy use information is for a device that can be worn or held by a person, the energy-use profile includes information related to a person such as use of the metabolism, blood oxygen level, temperature, or heart rate of the person. The synthetic cycles or energy use information can include information related to the movement of a person over the ground or in water as well as information related to other physical operations performable by a human other than for movement over the ground or in water, wherein such tasks include lifting or carrying weight, maintaining body temperature, performing mechanical work, exerting mental effort, or other energy-consuming physiological tasks.

In some embodiments, the generating of the synthetic cycles is also based on an actor profile used as a second input for the first model, and the actor profile input and the task profile input are two separate inputs of the first model. The actor profile can include a mobile-machine profile input, a vehicle profile input, or a person profile input. The profile can include respective duty or drive cycles. The actor profile in some examples can include information related to variable payload weight and auxiliary power requirements such as when the vehicle or the mobile machine includes auxiliary equipment such as construction systems, weapons systems, communications systems, heating ventilation and cooling (HVAC), and external electric charging. In some cases, a speed-time profile or a duty cycle or drive cycle is physics-compliant at each chronological step of the profile or cycle.

In some embodiments, the predicting of the energy-use profile or information (such as in method 1100) includes the second model predicting energy consumption over a route for each chronological step of a speed-time profile or a drive or duty cycle. In some examples, the predicted energy-use profile is also based on the task profile used as a second input for the second model, and the speed-time profile or the drive or duty cycle and the task profile input are two or three separate inputs of the second model. In some embodiments, the predicting of the energy-use profile includes using a road-load determination. In some examples, the road-load determination is enhanced through machine learning to capture terrain-specific energy use before its use in predicting the energy-use profile. In some cases, the road-load determination includes a pre-processing step based on digital signal processing, e.g., see step 1302 of method 1300 shown in FIG. 13. In such cases and others, at least part of the pre-processed data for determining road load can be inputted into an ANN, e.g., see steps 1304 and 1306 of method 1300. Also, in such examples and others, the output of the ANN or a derivative thereof can be used to enhance one or more of the inputs for the prediction of the energy-use profile or the energy-use information or a drive or duty cycle, e.g., see step 1308 of method 1300.

In some embodiments, the second model is part of an energy-management model having separate models for generating range extender control, state of charge profiles, mission profiles, and probability of completion. In some embodiments, the first model generates a route-optimized drive cycle, and a speed-time profile is generated according to the route-optimized drive cycle. In some cases, the second model includes a calibrated physics-based vehicle or powertrain model, and the energy-use profile is generated according to the calibrated physics-based vehicle or powertrain model.

FIG. 13 shows a method 1300 that can be a sub-method of steps 304, 306, 504, 704, 706, 904, 906, or 1110, or any other method step described herein related to the training of the models described herein or the generation of the synthetic cycles or the energy-use profiles or information. FIG. 13 illustrates a data processing method that includes digital signal processing and a trained computing scheme that includes at least one ANN. In some embodiments, within steps 304, 306, 504, 704, 706, 904, 906, or any other method step described herein related to the training of the models described herein or the generation of the synthetic cycles or the energy-use profiles or information, the computing system can execute complex processes that include running signal processing procedures or ANN-based analysis on data from one or more sensors or one or more of the inputs described herein (e.g., see the inputs illustrated in FIG. 1) to enhance at least some of the synthetic cycles or energy-use profile determinations or some of the corresponding data processing steps (e.g., see steps 1302 to 1308). In some examples of the methods, the determination of various attributes of an actor, an environment, or one of the inputs described herein is based at least partially on digital signal processing (e.g., see step 1302). In some instances, the digital signal processing occurs prior to an ANN-based analysis (such as an ANN-based computer vision analysis) as a pre-processing step to generate enhanced input for the ANN-based analysis (e.g., see steps 1302 and 1304). Also, even more specifically, in such cases, the ANN-based analysis includes inputting the enhanced input into an ANN (e.g., see scheme 1307 and step 1304), and the determination of the attributes in the data is based at least on the output of the ANN (e.g., see steps 1306 and 1308).

In general, some examples include the ANN-based analysis including inputting an input into an ANN (e.g., see scheme 1307), and the determination of the attributes of at least one of the inputs or profiles described herein is based at least on the output of the ANN (e.g., see step 1308). The ANN can include or can be a part of a deep learning process that determines attributes of at least one of the inputs or profiles described herein or can be a basis for the determination of attributes of at least one of the inputs or profiles described herein. In such cases, the deep learning process can include a convolutional neural network (CNN) or a recurrent neural network (RNN) of one or more artificial neural networks. Also, LSTM networks can be used.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. The present disclosure can refer to the action and processes of a computing system, or similar electronic computing device, which manipulates and transforms data represented as physical (electronic) quantities within the computing system's registers and memories into other data similarly represented as physical quantities within the computing system memories or registers or other such information storage systems.

While the invention has been described in conjunction with the specific embodiments described herein, such as embodiments for military use of the computing systems described herein, it is evident that many alternatives, combinations, modifications and variations are apparent to those skilled in the art and that embodiments can be applied to many different types of applications and use cases. Accordingly, the example embodiments of the invention, as set forth herein are intended to be illustrative only, and not in a limiting sense. Various changes can be made without departing from the spirit and scope of the invention.

What is claimed is:

1. A method, comprising:

recording, by a computing system, actual drive cycles, wherein each of the actual drive cycles comprises a series of data points representing the speed of a respective mobile machine versus time or distance while the respective mobile machine is moving through a respective area;

training, by the computing system, a route optimized drive cycle generator request (RODGR) model using the actual drive cycles;

using, by the computing system, a selected path as input for the trained RODGR model to generate a synthetic drive cycle, wherein the generation of the synthetic drive cycle by the RODGR model comprises dividing a route in the selected path into segments where similar route information is expected, wherein the generation of the synthetic drive cycle by the RODGR model comprises selecting a speed value for each segment of the segments, and wherein the segmentation of the selected path is determined by stop-and-go points or points where terrain changes; and using the synthetic drive cycle to at least partially control a mobile machine according to data in the synthetic drive cycle.

2. The method of claim 1, further comprising:

recording, by the computing system, route information corresponding to the actual drive cycles, wherein the route information comprises information on respective areas that respective mobile machines are moving through while the actual drive cycles are recorded; and using, by the computing system, the selected path and the route information as inputs for the trained RODGR model to generate the synthetic drive cycle.

3. The method of claim 2, wherein data points of the route information are recorded at corresponding data points of the actual drive cycles.

4. The method of claim 2, wherein the respective areas are part of a given path.

5. The method of claim 4, wherein a set of parameters of the given path have been recorded.

6. The method of claim 4, wherein a set of parameters of the given path are unknown and artificially generated using the trained RODGR model, and wherein a second set of parameters of the given path are pre-recorded and known.

7. The method of claim 2, wherein the actual drive cycles comprise drive cycles of different mobile machines.

8. The method of claim 2, wherein the selected path is selected from a map displayed by a graphical user interface.

9. The method of claim 2, further comprising using the synthetic drive cycle to generate a graphical user interface according to data in the synthetic drive cycle.

10. The method of claim 1, further comprising driving the mobile machines through at least part of the selected path during the recording of the actual drive cycles.

11. The method of claim 1, wherein the mobile machines are watercraft, aircraft, terrestrial vehicles, automobiles, or robots.

12. The method of claim 1, wherein the synthetic drive cycle is compliant with a physics model at each data point of a series of data points defining the synthetic drive cycle.

13. The method of claim 1, wherein the generation of the synthetic drive cycle by the RODGR model comprises checking each speed value for compliance with a physics model.

14. The method of claim 1, further comprising using deep learning with the RODGR model to enhance the generation of the synthetic drive cycle.

15. The method of claim 1, further comprising:

recording, by the computing system, actual duty cycles of auxiliary units of the mobile machines corresponding to the actual drive cycles, wherein the actual duty cycles comprise information on respective auxiliary unit usages of the mobile machines versus time or distance that is recorded while the actual drive cycles are being recorded; and using, by the computing system, the selected path and the actual duty cycles as inputs for the trained RODGR model to generate the synthetic drive cycle.

16. The method of claim 15, wherein data points of the actual duty cycles are recorded at corresponding data points of the actual drive cycles.

17. A method, comprising:

recording, by a computing system, actual drive cycles, wherein each of the actual drive cycles comprises a series of data points representing the speed of a respective mobile machine versus time or distance while the respective mobile machine is moving through a respective area;

recording, by the computing system, actual duty cycles of auxiliary units of mobile machines, wherein each of the actual duty cycles comprises a series of auxiliary data points representing auxiliary unit usage of a respective mobile machine versus time or distance while the respective mobile machine is moving through a respective area;

training, by the computing system, a route optimized drive cycle generator request (RODGR) model using the actual drive cycles and the actual duty cycles; and using, by the computing system, a selected path as an input for the trained RODGR model to generate a synthetic drive cycle and a synthetic duty cycle, wherein the generation of the synthetic drive cycle by the RODGR model comprises dividing a route in the selected path into segments where similar route information is expected, wherein the generation of the synthetic drive cycle by the RODGR model comprises selecting a speed value for each segment of the segments, and wherein the segmentation of the selected path is determined by stop-and-go points or points where terrain changes; and using the synthetic drive cycle to at least partially control a mobile machine according to data in the synthetic drive cycle.

18. The method of claim 17, further comprising:

recording, by the computing system, route information corresponding to the actual drive cycles and the actual duty cycles, wherein the route information comprises information on respective areas that respective mobile machines are moving through while the actual drive and duty cycles are recorded; and using, by the computing system, the selected path and the route information as inputs for the trained RODGR model to generate the synthetic drive cycle and the synthetic duty cycle.

19. A method, comprising:

recording, by a computing system, actual human drive cycles, wherein each of the actual human drive cycles comprises a series of data points representing the speed of a respective person versus time or distance while the respective person is moving through a respective area;

training, by the computing system, a route optimized drive cycle generator request (RODGR) model using the actual human drive cycles; and using, by the computing system, a selected path as input for the trained RODGR model to generate a synthetic human drive cycle, wherein the generation of the synthetic human drive cycle by the RODGR model comprises dividing a route in the selected path into continuous segments where similar route information is expected, wherein the generation of the synthetic human drive cycle by the RODGR model comprises selecting a speed value for each segment of the continuous segments, and wherein the segmentation of the selected path is determined by stop-and-go points or points where terrain changes; and using the synthetic human drive cycle to generate a graphical user interface according to data in the synthetic human drive cycle.

20. The method of claim 19, further comprising using deep learning with the RODGR model to enhance the generation of the synthetic human drive cycle.

* * * * *